No. 608,982. Patented Aug. 9, 1898.
J. W. GRAVES.
COTTON PRESS.
(Application filed Nov. 21, 1895.)

(No Model.) 4 Sheets—Sheet 1.

Witnesses.

Inventor
John W. Graves.

No. 608,982. Patented Aug. 9, 1898.
J. W. GRAVES.
COTTON PRESS.
(Application filed Nov. 21, 1895.)
(No Model.) 4 Sheets—Sheet 2.

Witnesses.
J. P. Coleman
Archie G. Ree

Inventor
John W. Graves
by Frank L. Dyer
Atty.

THE NORRIS PETERS CO., PHOTO-LITHO., WASHINGTON, D. C.

No. 608,982. Patented Aug. 9, 1898.
J. W. GRAVES.
COTTON PRESS.
(Application filed Nov. 21, 1895.)

(No Model.) 4 Sheets—Sheet 3.

Witnesses.

Inventor
John W. Graves.

No. 608,982.  
J. W. GRAVES.  
COTTON PRESS.  
(Application filed Nov. 21, 1895.)

Patented Aug. 9, 1898.

(No Model.)

4 Sheets—Sheet 4.

Witnesses.

Inventor  
John W. Graves.  
by Frank L. Dyer  
Atty.

UNITED STATES PATENT OFFICE.

JOHN W. GRAVES, OF LITTLE ROCK, ARKANSAS.

COTTON-PRESS.

SPECIFICATION forming part of Letters Patent No. 608,982, dated August 9, 1898.

Application filed November 21, 1895. Serial No. 569,657. (No model.)

*To all whom it may concern:*

Be it known that I, JOHN W. GRAVES, a citizen of the United States, residing at Little Rock, in the county of Pulaski and State of Arkansas, have invented certain new and useful Improvements in Cotton-Presses; and I do hereby declare the following to be a full, clear, and exact description of the invention, which will enable others skilled in the art to which it appertains to make and use the same.

My invention relates to various new and useful improvements in cotton-presses adapted to make cylindrical bales by spirally winding up a continuous sheet or bat while it is being subjected to pressure. My improvements are designed to simplify the construction of such cotton-presses and to increase the general efficiency thereof.

Broadly considered, my invention consists in a cotton-press wherein an endless belt or equivalent and two or more baling-rolls are combined in such a way that a bale will be formed by the joint action of both. In this way I produce a press in which a large portion of the bale, particularly during its final stages, will be subjected to pressure, so that the tendency of the bale to bulge or expand unduly is prevented.

My invention has relation not only to this broad idea, but also to important and desirable details of construction—such as the means for effecting pressure on the bale, the means for removing the finished bale from the press, and the means for driving the different pressure-surfaces of the press—and to other features of novelty, all as will be more fully hereinafter described and claimed.

In order that my invention may be more fully understood, attention is directed to the accompanying drawings, forming a part of this specification, and in which I illustrate two forms of press embodying my present improvements.

Figure 1:
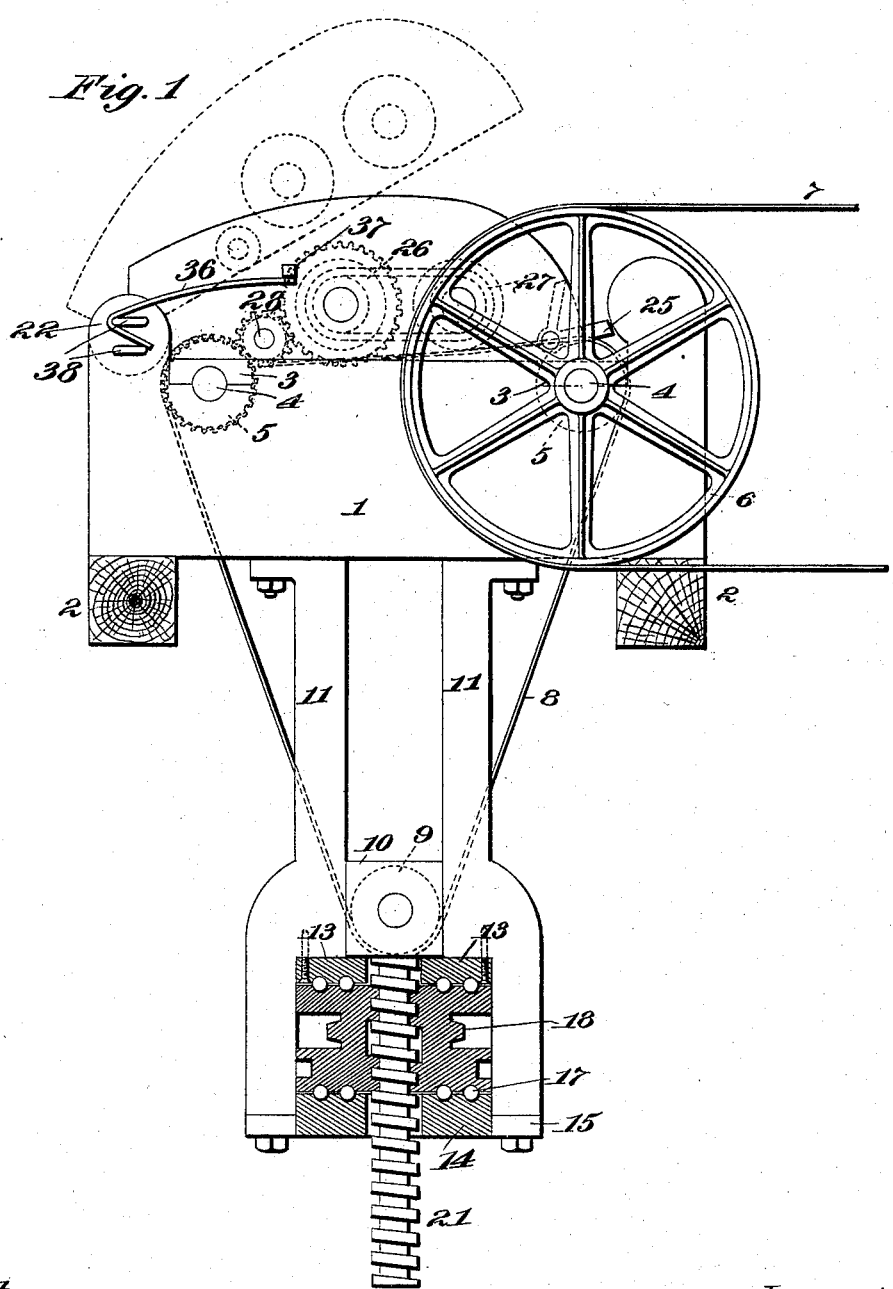
Figure 2:
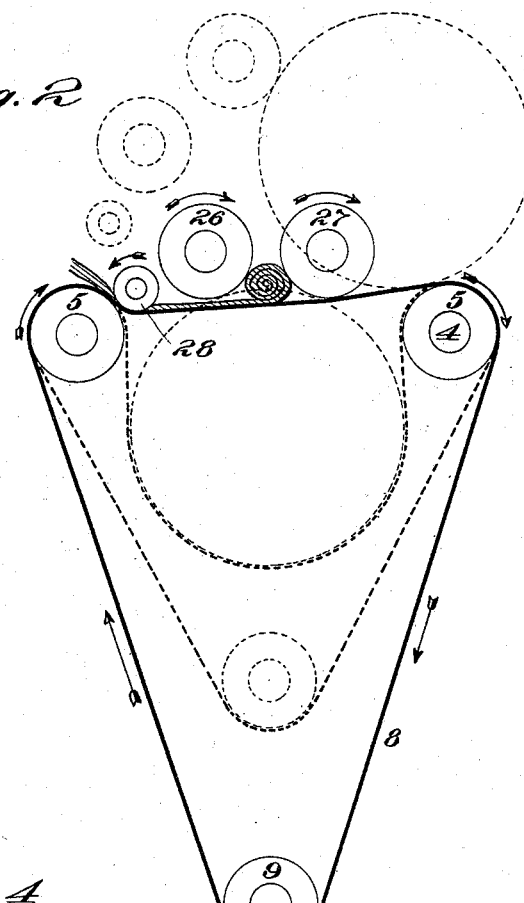
Figure 4:
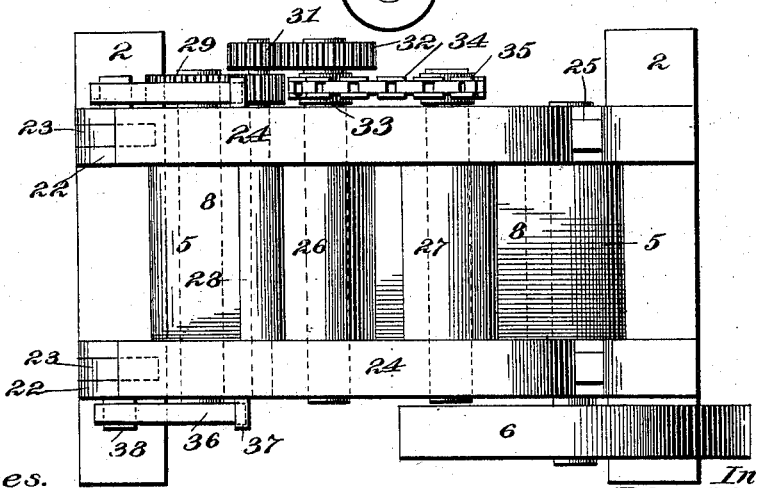
Figure 3:
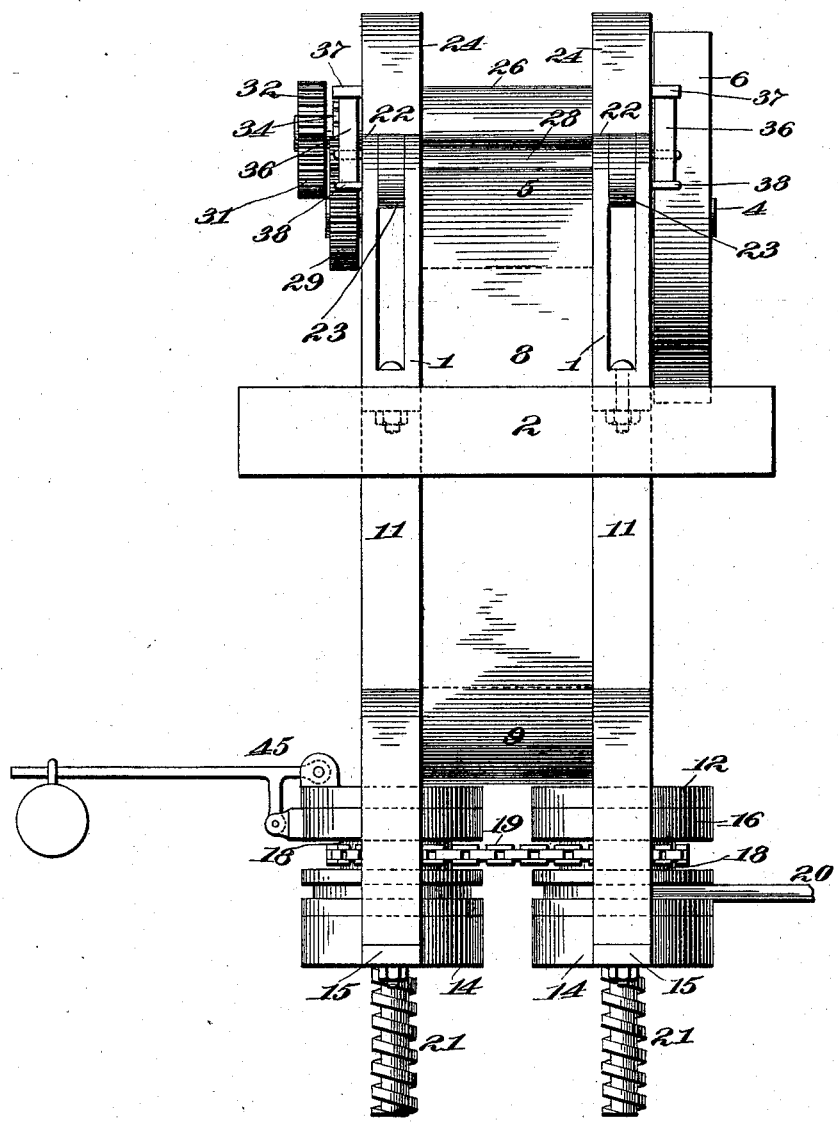
Figure 5:
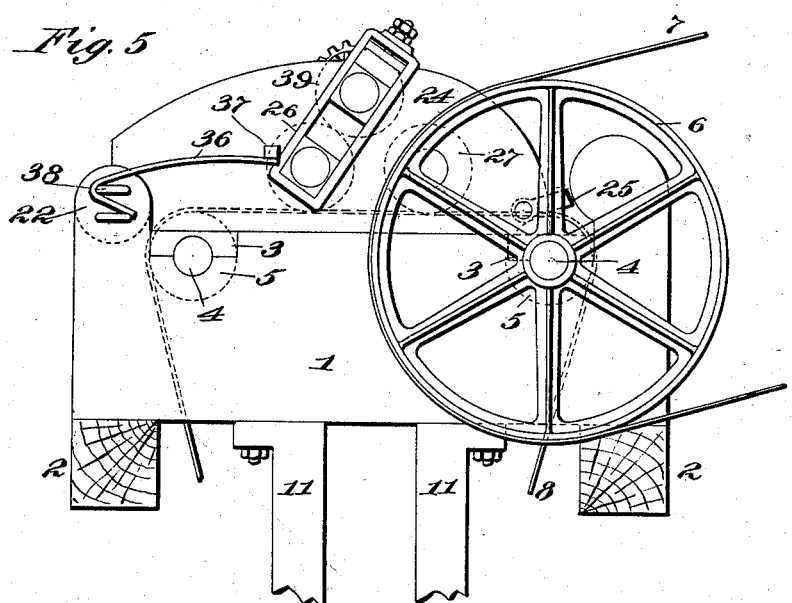

In the drawings, Figure 1 is a side elevation, partly in section, of the preferred form of press; Fig. 2, a diagram of the operative parts thereof; Fig. 3, a front view, the baling-rolls being removed; Fig. 4, a plan view of the press; Fig. 5, a side view of a modified construction of press, the pressure devices being removed; and Fig. 6, a view from the other side of the same.

In all the above views corresponding numerals indicate the same parts.

The press shown in Figs. 1, 2, 3, and 4 will be first described.

1 1 are the side frames, of the general shape shown, mounted on suitable heavy skids 2 2 or other appropriate foundation. These side frames are to be preferably cast hollow, so as to be light and strong, or they may consist of heavy plates strengthened by suitable webs in a well-known manner. If desired, these side frames may be connected together at the ends or at any suitable points by plates, rods, or braces, so as to form a very rigid structure; but this is not necessary, since the several shafts which are mounted in said frames serve for this purpose.

3 3 are journal-boxes in the side frames, near the front and rear ends thereof, and mounted in said journal-boxes are shafts 4 4, which extend directly across the press.

Mounted upon and keyed to each shaft 4 is a roller 5, which may be conveniently cast hollow. These rollers work closely between the side frames 1 1, so as to prevent cotton from wedging between said rollers and frames. One of the shafts 4, the forward shaft being shown, is provided at one end, outside of the frame, with a driving-pulley 6, driven by a belt 7 from any source of power.

8 is an endless compression-belt which is carried over the rollers 5 5 and extends directly below the press, being provided with a tension-roller 9 within its lower portion. This belt may be made of leather, heavy canvas, rubber, or similar materials or combinations of such materials, or, instead, the said belt can be made of metal links in any convenient way. When a flexible belt is employed, such as a leather belt, the rollers 5 5 are preferably provided with perfectly flat bearing-surfaces; but when said belt is made of metal links one of said rollers may be provided with sprocket-teeth on its periphery for the proper guidance and driving of the belt.

The shaft of the tension-roller 9 is mounted in blocks 10 10, which work in suitable guides 11 11, bolted to the under side of the side frames 1 1, as shown. 12 is a circular plate secured between each pair of guides 11 11 and bearing against shoulders 13, so that all strains due to the enlargement of the bale will be taken up directly by said guides.

At the lower end of each pair of guides is a second and preferably heavier plate 14, provided with lugs or ears 15, bolted to the lower ends of said guides. Carried between the plates 12 and 14 at each side of the machine is a heavy nut 16, suitable antifriction-balls 17 being employed to allow the nut to revolve between said plates. Instead of such balls antifriction-rollers may be used for this purpose, or said balls or rollers may be dispensed with, and if the wearing-surfaces are well greased the parts will operate satisfactorily. Each of the nuts 16 is cut away at its central part and provided with sprocket-teeth 18. Connecting the sprocket-teeth of the two nuts is a suitable sprocket-chain 19, whereby both of said nuts will be revolved simultaneously. One or both of said nuts may be provided with a groove therein, with which a belt 20 may engage for revolving the nuts when desired, said belt being connected with the source of power. It is of course obvious that the said nuts may be operated in any other way.

Each bearing-block 10 is provided with a heavy screw 21, extending downwardly therefrom and engaging with the nut 16, which is directly below. These screws are rigidly secured to said blocks, so that when the tension-roller 9 is moved up or down said nuts will be caused to revolve together.

The rear end of each side frame is provided with upwardly-extending ears 22, and between said ears is pivoted a projection 23 of the top frames 24, so as to form a heavy hinge-point. Said top frames are preferably of the general semicircular shape shown, and the bottom edges are flush with the tops of the side frames 1. The top frames 24 24 are normally locked in this position by any suitable kind of a lock 25, which is capable of being readily released under considerable pressure.

Mounted in the top frames 24 24 in appropriate heavy bearings are two baling-rolls 26 and 27, the former being located a short distance above the belt 8 and the latter being almost, if not actually, in contact with said belt. These baling-rolls are of any suitable construction and preferably have perfectly plain smooth surfaces.

28 is a compression-roller mounted in the top frames 24 24 and pressing the belt 8 directly upon the roller 5 at the rear of the machine. This roller 28 not only serves to put the bat in a tightly-pressed condition before reaching the baling-rolls, but also materially increases the friction of the belt on the roller 5, so that said roller will be more effectively driven by said belt. Said compression-roller serves also to more or less incline that portion of the belt 8 between the baling-rolls 26 and 27, whereby the latter may occupy the same horizontal plane and yet be properly located with respect to that portion of the belt.

29 is a gear-wheel on the shaft of the roller 5 at the rear of the machine, meshing with a gear-wheel 30, carried on the shaft of the compression-roller 28, so that said rollers will be driven in opposite directions, but at the same or substantially the same peripheral speed.

31 is a gear-wheel keyed to the shaft of the compression-roller 28 outside of the gear-wheel 30 and meshing with a gear-wheel 32, keyed to the shaft of the baling-roll 26, whereby said baling-roll is driven oppositely to the compression-roller.

The shaft of the baling-roll 26, inside of the gear-wheel 32, is provided with a sprocket-wheel 33, and a sprocket-chain 34 connects the same with a sprocket-wheel 35, keyed to the shaft of the baling-roll 27, so that the two baling-rolls will be rotated in the same direction and at the same speed.

By means of the arrangement of gears above described, which of course is capable of many changes, all the rollers and rolls will be driven in the direction of the arrows indicated thereon.

In order to prevent the top frames carrying the baling-rolls from descending too rapidly after the bale has been removed and thereby injuring the machine, I employ, preferably, a cushioning or counterbalancing device for this purpose. In the drawings I show a spring 36 for this purpose engaging beneath a lug 37, cast on each top frame and carried at its rear end between two flat parallel lugs 38 38, cast with the projection 22 of each side frame. Each of these springs is under considerable initial tension, so as to effectively cushion the top frames in their descent.

It will be noted that by means of this arrangement of springs I automatically provide for the increased weight of the top frames as they approach a horizontal position. It is of course obvious that a counterbalancing weight or weights may be employed instead of these cushioning-springs.

Figure 6:
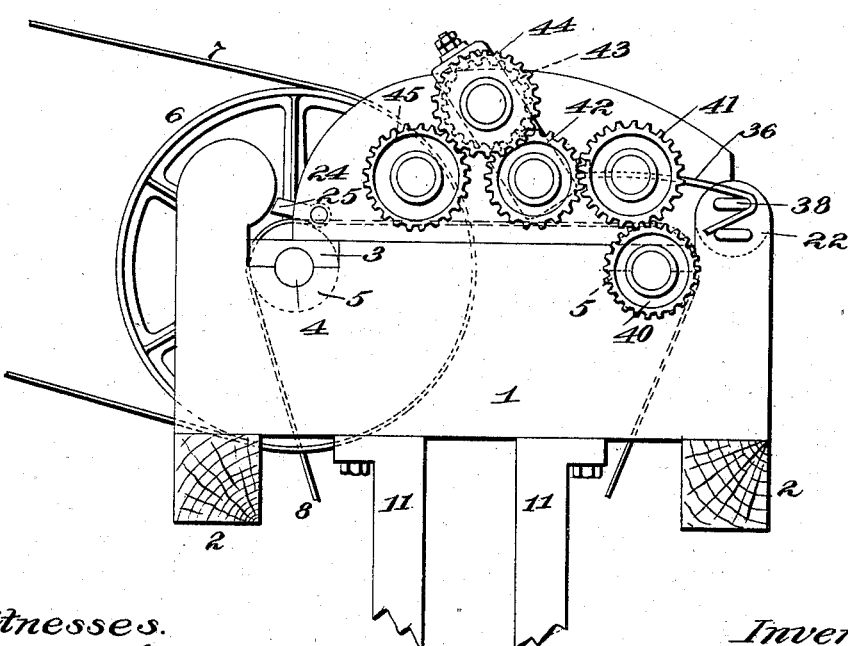

Referring to Figs. 5 and 6, which illustrate a modification of the press just described, it will be seen that I have retained almost all of the features to which I have above made reference. In this modified press the upper portion of the belt 8 extends directly across on a substantially horizontal plane between the rollers 5 5, being in contact, or nearly so, with both of the baling-rolls 26 and 27. Instead of making use of a compression-roller 28 working upon the belt, I employ in this form a preferably somewhat larger compression-roller 39, carried in bearings in the top frames and pressing against the baling-roll 26. This compression-roller 39 is preferably mounted in bearings of the character shown, so as to allow the rollers 26 and 39 to separate slightly, more or less, according to the thickness of the bat. I also show a modified arrangement of gears for driving the various rolls and rollers. A pulley 7 operates the forward roller 5, driving the belt 8 and the rear roller 5. The latter roller has a gear-wheel 40 keyed to its shaft, which meshes with an idler 41, carried in the top frames. The latter meshes with a gear-wheel 42 on the shaft of the baling-roll 26, which gear-wheel 42 drives a gear-wheel 43 on the shaft of the compression-roller 39.

Outside of the gear-wheel 43 and keyed to the shaft of the compression-roller 39 is a gear-wheel 44, which drives a gear-wheel 45 on the shaft of the baling-roll 27. By means of this arrangement of gears the belt, rolls, and rollers will be driven in the direction of the arrows indicated respectively thereon and at the same surface speed, or substantially so.

In Figs. 5 and 6 I have not shown any means for affecting tension in the belt; but it is to be understood that means for that purpose are to be employed.

In both forms of press I prefer to arrange the baling-rolls 26 27 and the belt 8 so as to fit closely between the smooth inner faces of the side frames 1 1, whereby said faces will not only serve to guide the sheet or bat onto the forming bale, but also will tend to smooth or even up the ends of the bale. In this way bales with perfectly flat ends can be produced.

The operation of the press illustrated in Figs. 1, 2, 3, and 4 will be first described. Power being applied to the pulley 6, the belt 8, baling-rolls 26 and 27, and compression-roller 28 will be driven in the direction of the arrows, it being understood that the tension-roller 9 is at its lowermost position. (Shown in Figs. 1, 2, and 3.) Cotton in the form of a continuous sheet or bat, coming from the ordinary condenser, is now fed beneath the compression-roller 28 and tightly compressed, whereby strength and smoothness will be imparted thereto, and most of the air contained therein will be expelled therefrom. The sheet or bat in this condition is fed forward on the belt and passes beneath the baling-roll 26, being guided, preferably, by the smooth inner faces of the side frames 1 1. The other baling-roll 27, being in contact with the belt, or nearly so, and moving in a direction opposing the belt, will sweep the sheet or bat off of the belt, and the sheet or bat will be thrown back into the triangular space formed between the baling-rolls and the belt. As the cotton accumulates in this space it will presently form a mass sufficiently large to be borne upon by the two baling-rolls and the belt, and this mass will therefore commence to revolve and will assume a generally cylindrical shape to form the nucleus of the desired bale. As the cotton continues to be fed in by the belt it will be wound spirally upon itself, being at all times subjected to the pressure of the baling-rolls and the belt. The bale will therefore slowly increase in diameter and will tend to distend the belt 8, so as to elevate the tension-roller 9 in the guides 11. The elevation of the tension-roller 9 will be resisted by the nuts 16, which will be slowly rotated by means of the screws 21. In this way the desired amount of pressure will be applied to the bale. When the bale has reached the proper size, as shown in dotted lines, Fig. 2, it will be pressed upon for about one-half of its surface by the belt, and the baling-rolls will also exert pressure on its upper portions, so that there will be only a small portion of the bale not subjected to pressure, and hence very little expansion can take place in the bale.

During the formation of the bale the inner faces of the side frames are preferably pressing continuously against the ends of the bale, so as to smooth and even up the same, thereby producing a bale having perfectly flat smooth ends. When the bale has been finished, the supply of cotton is cut off, after which the bale is suitably covered and bound, if desired, while still subjected to pressure. The latch 25 is now operated, so as to allow the upper frames freedom of movement with respect to the side frame, whereupon the belt 20 is operated to drive the nuts 16 16 in a reverse direction, so as to move the tension-roller 9 downward, straightening out that portion of the belt in contact with the bale and ejecting the bale from the press, as shown in dotted lines in Fig. 1. When the bale has been removed, the top frames, carrying the baling-rolls and compression-roller, will descend by their weight, being cushioned by the springs 36, if used.

The operation of the modified construction of press illustrated in Figs. 5 and 6 is substantially the same as that above described except that the bat or sheet of cotton is fed between the compression-roller 39 and baling-roll 26. So far as the accumulation of the cotton into and upon the bale and the manner of ejecting the bale are concerned they are practically identical with the corresponding operations of the preferred press.

Before claiming my invention I desire to state that the two forms of presses shown may be changed in many respects without departing from the spirit of my invention. For instance, a compression-roller may be dispensed with and the bat fed into the baling-space directly from the condenser; also, a single baling-roll might be used, suitable means being provided for keeping the bale in contact with the same; also, more than two baling-rolls may be employed, arranged, preferably, so that all will press upon the bale; also, the press may be inverted, the baling-rolls being therefore below the belt and the tension device being above the other parts; also, the two nuts may be provided with gear-wheels which mesh together, one of the screws being right and the other left handed; also, other means for effecting pressure on the belt may be employed, such as a power-cylinder, a weight, or a braking mechanism; also, a brake, such as the conventional representation 45 in Fig. 3, may be applied to one or both of the nuts to increase the pressure on the bale; also, when two baling-rolls are used adapted to move out of the path of the ejected bale one or more rolls may be employed in conjunction therewith instead of a belt—for instance, two baling-rolls set opposite to the baling-rolls 26 and 27 and movable downward against a resistance with the enlarging bale.

I believe I am the first to suggest the idea of employing two or more movable baling-rolls movable out of the path of the ejected bale, combined with other baling mechanism, and I shall claim the same broadly; also, the combination of such rolls and a belt; also, the tension device described, and the various other novel features particularly noted in my claims.

Having now described my invention, what I claim as new, and desire to secure by Letters Patent, is as follows:

1. In a cotton-press, the combination of two baling-rolls arranged close together, a belt a portion of which is in contact or nearly so with one of said baling-rolls but is out of contact with the other baling-roll, whereby cotton in the shape of a continuous sheet or bat may be passed beneath the latter baling-roll into the space formed between said baling-rolls and belt for the accumulation thereof into a bale, said belt being movable away from said baling-rolls as the bale enlarges, and means for supporting the belt so that a bight may be formed, substantially as set forth.

2. In a cotton-press, the combination of a base, two rollers mounted in said base, an endless belt passing over said rollers, a tension-roller in said belt, means for resisting the movement upward of said tension-roller, and two or more baling-rolls arranged normally adjacent to and above said belt but movable away from the same, substantially as set forth.

3. In a cotton-press, the combination of a base, two rollers mounted in said base, an endless belt passing over said rollers, a swinging frame mounted over said base, two baling-rolls carried in said swinging frame and adjacent to said belt, and a compression-roller mounted in said frame adjacent to said baling-rolls and normally forcing said belt against one of said rollers and away from one of said baling-rolls, whereby when said frame is swung upward to release the pressure on the bale, the said compression-roller will be withdrawn from contact with the belt, substantially as set forth.

4. In a cotton-press, the combination of a base, two rollers mounted in said base, an endless belt passing over said rollers, two baling-rolls mounted adjacent to and above said belt, and a compression-roller adjacent to said baling-rolls for forcing said belt against one of said rollers and away from one of said baling-rolls, substantially as set forth.

5. In a cotton-press, the combination of a base, two rollers mounted in said base, an endless belt passing over said rollers, two baling-rolls mounted adjacent to and above said belt, a compression-roller adjacent to said baling-rolls for forcing said belt against said baling-rolls and away from one of said rollers and away from one of said baling-rolls, means for driving said belt, connections between said belt and said compression-roller for driving the latter, and connections between said compression-roller and said baling-rolls for driving said baling-rolls, substantially as set forth.

6. In a cotton-press, the combination of means for winding a continuous sheet or bat of cotton into a cylindrical bale, and a pressure device coöperating therewith for applying pressure to said bale, comprising a nut and a screw engaging said nut for revolving the latter, substantially as set forth.

7. In a cotton-press, the combination of means for winding a continuous sheet or bat of cotton into a cylindrical bale, and a pressure device coöperating therewith for applying pressure to said bale, comprising a nut, a screw engaging said nut for revolving the latter, and means for resisting the revolution of said nut, substantially as set forth.

8. In a cotton-press, the combination of means for winding a continuous sheet or bat of cotton into a cylindrical bale, and a pressure device coöperating therewith for applying pressure to said bale, comprising a nut, a screw engaging said nut for revolving the latter, and a friction-brake for resisting the revolution of said nut, substantially as set forth.

9. In a cotton-press, the combination of means for winding a continuous sheet or bat of cotton into a cylindrical bale, and a pressure device coöperating therewith for applying pressure to said bale, comprising a nut, a series of balls forming a bearing for the same, and a screw engaging said nut for revolving the latter, substantially as set forth.

10. In a cotton-press, the combination of means for winding a continuous sheet or bat of cotton into a cylindrical bale, and a pressure device coöperating therewith for applying pressure to said bale, comprising two stationary plates, a nut revolubly mounted between said plates, balls between said nut and said plates, and a screw engaging said nut for revolving the latter, substantially as set forth.

11. In a cotton-press, the combination of means for winding a continuous sheet or bat of cotton into a cylindrical bale, and a pressure device coöperating therewith for applying pressure to said bale comprising a plurality of nuts connected together and operating simultaneously, and screws engaging said nuts for revolving the same, substantially as set forth.

12. In a cotton-press, the combination of means for winding a continuous sheet or bat of cotton into a cylindrical bale, a pressure device coöperating therewith for applying pressure to said bale comprising a nut and a screw engaging said nut for revolving the nut, and independent means for reversing the rotation of said nut for releasing the pressure, substantially as set forth.

13. In a cotton-press, the combination of a base, two rollers mounted in said base, an endless belt passing over said rollers for effecting pressure on the bale, a tension-roller in said belt carried in movable bearing-blocks, a screw connected rigidly with each bearing-block, and a nut on said screw for resisting the upward movement of said tension-roller, substantially as set forth.

14. In a cotton-press, the combination of a base, two rollers mounted in said base, an endless belt passing over said rollers for effecting pressure on the bale, a tension-roller in said belt carried in movable bearing-blocks, a screw connected rigidly with each bearing-block, a nut on said screw for resisting the upward movement of said tension-roller, and means for reversing the rotation of said nuts for ejecting the finished bale, substantially as set forth.

15. In a cotton-press, the combination of a base, two rollers mounted in said base, an endless belt passing over said rollers for effecting pressure on the bale, a tension-roller in said belt carried in movable bearing-blocks, a screw connected rigidly with each bearing-block, nuts on said screws for resisting the upward movement of said tension-roller, and connections between said nuts for revolving them simultaneously, substantially as set forth.

In testimony whereof I affix my signature in presence of two witnesses.

JOHN W. GRAVES.

Witnesses:
W. E. ANDERSON,
A. L. BREYSACHER, Jr.